United States Patent
Gorokhov et al.

(10) Patent No.: US 8,457,152 B2
(45) Date of Patent: Jun. 4, 2013

(54) MULTIPLE MODULATION SCHEMES IN SINGLE RATE LAYERING WIRELESS COMMUNICATION SYSTEMS

(75) Inventors: Alexei Gorokhov, San Diego, CA (US); Avneesh Agrawal, San Diego, CA (US); Dhananjay Gore, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 805 days.

(21) Appl. No.: 11/155,204

(22) Filed: Jun. 16, 2005

(65) Prior Publication Data

US 2006/0014499 A1     Jan. 19, 2006

Related U.S. Application Data

(60) Provisional application No. 60/588,630, filed on Jul. 16, 2004, provisional application No. 60/639,073, filed on Dec. 22, 2004.

(51) Int. Cl.
*H04J 3/16* (2006.01)
*H04J 9/00* (2006.01)

(52) U.S. Cl.
USPC .......................................... 370/465; 370/204

(58) Field of Classification Search
USPC ................................. 370/465, 204
See application file for complete search history.

(56) References Cited

U.S. PATENT DOCUMENTS

| | | | |
|---|---|---|---|
| 5,760,941 A | 6/1998 | Young et al. | |
| 6,601,167 B1 | 7/2003 | Gibson et al. | |
| 6,907,272 B2 * | 6/2005 | Roy | 455/562.1 |
| 6,993,299 B2 * | 1/2006 | Sugar et al. | 455/103 |
| 7,272,190 B2 * | 9/2007 | Blankenship et al. | 375/260 |
| 7,339,980 B2 * | 3/2008 | Grant et al. | 375/148 |
| 7,447,269 B2 | 11/2008 | Tamaki et al. | |
| 7,680,461 B2 * | 3/2010 | Takano | 455/69 |
| 7,885,228 B2 * | 2/2011 | Walton et al. | 370/329 |

(Continued)

FOREIGN PATENT DOCUMENTS

| | | |
|---|---|---|
| EP | 1 255 369 A1 | 4/2001 |
| TW | 543306 B | 7/2003 |
| WO | WO 02/30032 A2 | 11/2002 |
| WO | WO 03/050968 A2 | 6/2003 |

OTHER PUBLICATIONS

Tang et al, "Variable-Rate Adaptive Modulation in MIMO Systems Exploiting Multiuser Diversity", 2004IEEE International Conference on Acoustics, Speech, and Signal Processing IEEE Piscataway, NJ, USA, vol. 4, (May 17, 2004) p. 693-696.

(Continued)

*Primary Examiner* — Mark Rinehart
*Assistant Examiner* — Angel Brockman
(74) *Attorney, Agent, or Firm* — Howard Seo

(57) ABSTRACT

A MIMO communication system is adapted to encode multiple data streams at the same adaptable rate. Accordingly, the set of all possible modulation/rate combinations to all modulations with common rates is decreased thus resulting in the reduction of the number of possible packet formats carrying the data streams. Rate prediction is made more error-resilient, in part, due to the averaging over all information rates. Furthermore, the signaling overhead of the packets is reduced. Therefore, the tradeoff between the desired transmission rate granularity on the one hand, and robustness/signaling overhead on the other hand, is controlled by adjusting the coding rate.

17 Claims, 3 Drawing Sheets

U.S. PATENT DOCUMENTS

| | | | |
|---|---|---|---|
| 2004/0002364 A1* | 1/2004 | Trikkonen et al. | 455/562.1 |
| 2004/0042427 A1 | 3/2004 | Hottinen | 370/335 |
| 2004/0042556 A1* | 3/2004 | Medvedev et al. | 375/260 |
| 2004/0052315 A1* | 3/2004 | Thielecke et al. | 375/299 |
| 2004/0178954 A1* | 9/2004 | Vook et al. | 342/383 |
| 2005/0152465 A1* | 7/2005 | Maltsev et al. | 375/260 |
| 2005/0245197 A1* | 11/2005 | Kadous et al. | 455/67.13 |
| 2005/0286404 A1* | 12/2005 | Poon | 370/208 |
| 2005/0286505 A1 | 12/2005 | Harrison | |
| 2006/0040650 A1* | 2/2006 | Schepers et al. | 455/419 |
| 2006/0104377 A1* | 5/2006 | Chimitt et al. | 375/261 |
| 2006/0159120 A1* | 7/2006 | Kim | 370/465 |
| 2007/0064831 A1* | 3/2007 | Bjerke et al. | 375/267 |
| 2007/0142089 A1* | 6/2007 | Roy | 455/562.1 |
| 2008/0075207 A1* | 3/2008 | Hwang et al. | 375/346 |

OTHER PUBLICATIONS

Catreux et al, Data Throughputs Using Multiple-Input Muliple-Output (MIMO) Techniquest in a Noise-Limited Cellular Environment, IEEE Transactions on Wireless Communications IEEE USA, vol. 1, No. 2, (Apr. 2002), pp. 226-235.

TaiwansearchReport—TW094124017-TIPO—Aug. 3, 2011.

International Search Report, PCT/US05/025156, International Search Authority, European Patent Office, Nov. 8, 2005.

Written Opinion, PCT/US05/025156, International Search Authority. European Patent Office, Nov. 8, 2005.

International Preliminary Report on Patentability, PCT/US05/025156, International Preliminary Examining Authority, European Patent Office. Jun. 26, 2006.

Biglieri. E. et al.: "Limiting Performance of Block-Fading Channels with Multiple Antennas," IEEE Transactions on Information Theory, May 2001, pp. 1273-1289, vol. 47, No. 4, IEEE Information Theory Society, New York. NY, USA.

Foschini, G.: "Layered Space-Time Architecture for Wireless Communication in a Fading Environment When Using Multi-element Antennas," Bell Labs Technical Journal, Autumn 1996, pp. 41-59, vol. 1, No. 2, John Wiley & Sons, Inc., Hoboken, NJ, USA, XP000656005.

* cited by examiner

MULTIPLE MODULATION SCHEMES IN SINGLE RATE LAYERING WIRELESS COMMUNICATION SYSTEMS

CLAIM OF PRIORITY UNDER 35 U.S.C. §119

The Present Application For Patent Claims Priority to Provisional Application No. 60/588,630 Entitled "MIMO Transmission Scheme" filed Jul. 16, 2004 and Provisional Application No. 60/639,073 filed Dec. 22, 2004, and assigned to the assignee hereof and hereby expressly incorporated by reference herein.

BACKGROUND OF THE DISCLOSURE

The present disclosure relates to wireless communications, and more particularly to multiple-input multiple-output communication systems.

Demand for wireless communication and data processing systems is on the rise. Inherent in most communication channels are errors introduced when transferring frames, packets or cells containing data. Such errors are often caused by electrical interference or thermal noise.

Data is often encoded at the transmitter, in a controlled manner, to include redundancy. The redundancy is subsequently used by the receiver to overcome the noise and interference introduced in the data while being transmitted through the channel. For example, the transmitter might encode k bits with n bits where n is greater than k, according to some coding scheme. The amount of redundancy introduced by the encoding of the data is determined by the ratio n/k, the inverse of which is referred to as the code rate. Codewords representing the n-bit sequences are generated by an encoder and delivered to a modulator that interfaces with the communication channel. The modulator maps each received sequence into a symbol. In M-ary signaling, the modulator maps each n-bit sequence into one of $M=2^n$ symbols. Data in other than binary form may be encoded, but typically data is represented by a binary digit sequence.

At the receiving end of a transmission channel, the coded symbols must be decoded. The Viterbi algorithm is an efficient maximum-likelihood sequence detection method for decoding convolutional and trellis coded symbols transmitted over AWGN channels.

In accordance with the Viterbi algorithm, for each received signal, a distance between that signal at time $t_i$ and all the trellis paths entering each state at time $t_i$ is calculated. In the Viterbi algorithm, the minimum Euclidean distance is selected as the optimum branch metric for decoding convolutional and trellis sequences transmitted in AWGN channels.

One type of wireless communication system is a multiple input multiple output (MIMO) system. In a MIMO system, the transmitter includes multiple transmit antennas and the receiver includes multiple receive antennas. The transmitter splits the data to be transmitted into a number of streams (typically bit streams) and transmits the streams via the multiple transmit antennas. The receiver receives the transmitted streams via the multiple receive antennas.

MIMO communication systems can benefit from knowing the channel state information (CSI) at the transmitter side. For example, in time-division duplex (TDD) systems both forward link (FL) transmissions and reverse link (RL) transmissions make use of the same spectrum and therefore the substantially the same physical channel. The equivalence between FL and RL channels, also referred to as channel reciprocity, enables the use of the CSI acquired during the reception phase, e.g. channel estimation at the base transceiver station (BTS) during the RL and/or at the mobile station (MS) during the RL for the subsequent transmission phase, e.g., FL at BTS and/or RL at MS.

One well known technique that uses CSI to improve transmission performance is commonly known as the eigenbeamforming. In accordance with the eigenbeamforming technique, a number of signals are transmitted along the directions of the principal components of the MIMO channel. If the CSI is assumed not to contain any mismatches, the eigenbeamforming maps a MIMO channel into a set of equivalent single-input-single-output (SISO) communication channels. These channels are subsequently used to transmit either multiple coded streams (tuned to the respective principal components) or a single coded stream spread over the multiple SISO channels.

Another well known technique that uses the CSI to improve transmission performance is commonly known as layering. In accordance with the layering technique, multiple coded streams are transmitted over different layers. The receiver successively decodes the streams associated with each layer and removes the contributions of the decoded layer from the received signal, thereby reducing interference for the following layers. The layering technique provides for achieving a high rate in the absence of accurate CSI at the transmitter. Hence, the layering technique with multiple coded streams is more suited in situations where the CSI may vary. Such a situation occurs in mobile cellular TDD systems where the CSI acquired due to the FL/RL reciprocity degrades as the channel variation rate grows.

BRIEF SUMMARY OF THE DISCLOSURE

In an embodiment, a wireless communication device comprises a plurality of encoders each adapted to generate an encoded data segment; wherein the plurality of encoders are configured to encode the data segments they receive at the same rate for simultaneously encoded data segments, a plurality of modulators each adapted to receive and modulate a different one of the plurality of encoded data segments to generate a modulated data segment according to a modulation technique, wherein at least two of the modulators utilize different modulation techniques for simultaneously modulated data segments. The wireless communication further comprising a plurality of transmitters each adapted to receive and process a different one of the transformed signals.

In another embodiment, a wireless communication device comprises a plurality of receivers each adapted to receive a first plurality of signals. The wireless communication device further comprises a combiner configured to recover a plurality of modulated data segments, a plurality of demodulators each adapted to receive and demodulate a different one of the recovered data segments and to generate a demodulated data segment, wherein the demodulators demodulate at least some of the recovered data segments according to different demodulation techniques, and a plurality of decoders each adapted to receive and decode a different one of the plurality of demodulated data segments.

In a further embodiment, a method comprises modulating each of a plurality of encoded data segments to generate a plurality of modulated data segments, wherein at least two of the plurality encoded data segments are modulated according to different modulation techniques. The method further comprises transmitting the plurality of modulated data segments.

In an additional embodiment, a method comprises recovering a plurality of data segments, demodulating each of the plurality of recovered data segments, and decoding each of the plurality of demodulated data segments. At least some of the recovered data segments are demodulated according to different demodulation techniques.

DETAILED DESCRIPTION OF THE DISCLOSURE

In accordance with the present disclosure, multiple streams in a MIMO communication system are encoded at the same adaptable rate. Accordingly, the set of all possible modulation/rate combinations to all modulations with common rates is decreased thus resulting in the reduction of the number of possible packet formats carrying the data streams. Rate prediction is made more error-resilient, in part, due to the averaging over all information rates. Furthermore, the signaling overhead of the packets is reduced. Therefore, in accordance with the present disclosure, the tradeoff between the desired transmission rate granularity on the one hand, and robustness/signaling overhead on the other hand, is controlled by adjusting the coding rate.

Figure 1:
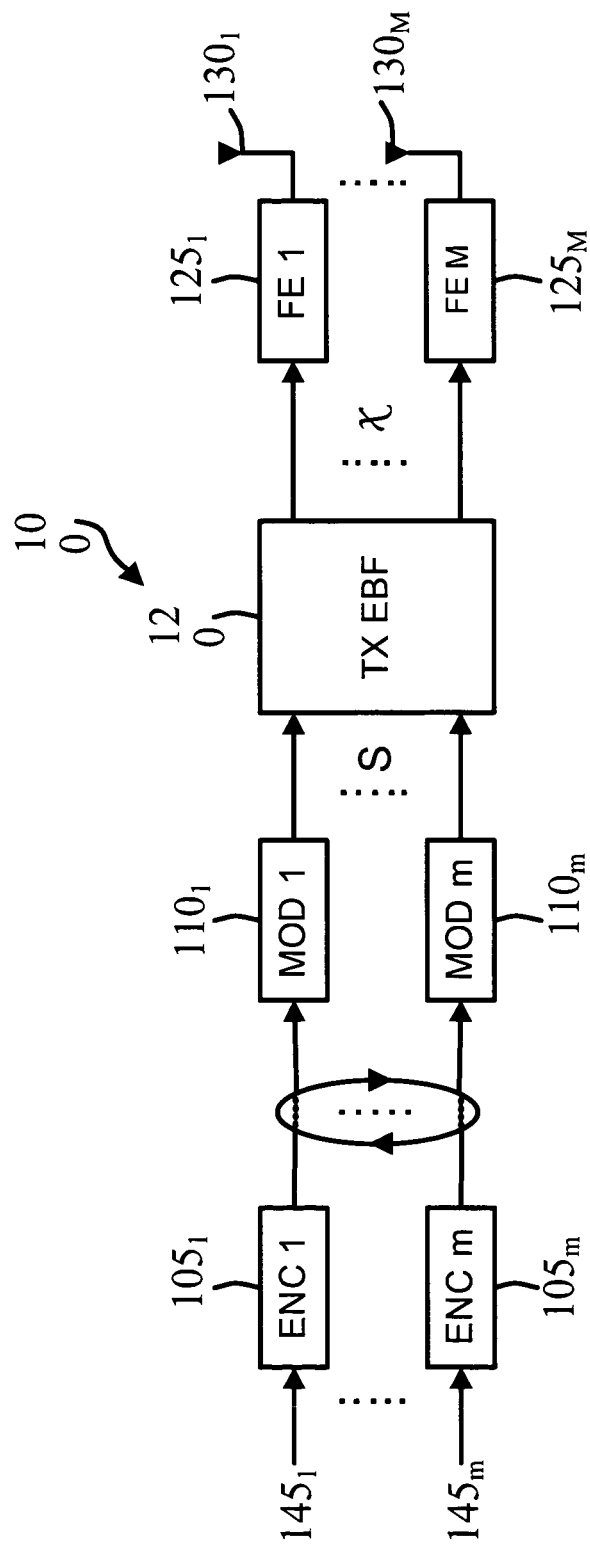
FIG. 1 is a simplified high-level block diagram of an M-channel transmitter of a communication device for a MIMO communication system, in accordance with one embodiment of the present disclosure.

FIG. 1 is a simplified high-level block diagram of a multichannel transmitter (hereinafter alternatively referred to as transmitter) 100 of a wireless communication device of MIMO communication system, in accordance with one embodiment of the present disclosure. In the embodiment of FIG. 1, the MIMO communication system is shown as being M by K. Transmitter 100 includes, in part, m encoders $105_1 \ldots 105_m$, m modulators $110_1 \ldots 110_m$, eigenbeamforming block 120, and M transmitters $125_1 \ldots 125_M$. The signals generated by the m transmitters are transmitted by M transmit antennas $130_1 \ldots 130_M$ each associated with a different one of the M front end blocks. In the following, different instances of similar components are alternatively identified by similar reference numerals having different indices--the indices appear as subscripts to the reference numerals. For example, the m instances of encoders are identified as $105_1 \ldots 105_m$ or alternatively identified with reference numeral 105.

The m data segments to be transmitted via the M transmit antennas, where m≦M, are first encoded by encoders 105 using any one of known encoding schemes incorporating any one of a number of error correction algorithms, such as forward error correction (FEC). Each encoder 105 may use a different error correction algorithm. As described further below, however, each encoder 105 encodes the data segment it receives using the same data rate. The encoded data segments are successively supplied to modulators 110. Each modulator 110 may perform a different modulation technique. For example, modulator $110_1$ may be configured to perform phase shift keying (PSK) modulation technique and modulators $110_2$ may be configured to perform quadrature amplitude modulation (QAM) technique.

It is understood that the m data segments may be part of the same data stream. Alternatively, each of the m data segments may be a part of a different data stream. In either case, each segment may be modulated using several different modulation schemes, e.g. in a round robin manner. Assume for example that a data segment includes m encoded blocks. Then, the first encoded block of the first data segment may be modulated by modulator $110_1$, the second encoded block of the first data segment may be modulated by modulator $110_2$, the mth encoded block of the first data segment may be modulated by modulator $110_m$, etc. Similarly, for example, the first encoded block of the second data segment may be modulated by modulator $110_2$, the second encoded block of the second data segment may be modulated by modulator $110_3$, the $(m-1)^{th}$ encoded block of the second data segment may be modulated by modulator $110_m$, and the $m^{th}$ encoded block of the second data segment may be modulated by modulator $110_1$.

The m modulated outputs of the m modulators 110 are supplied to eigenbeamforming block 120, which is adapted to beamform the modulation symbols or blocks of symbols for each transmission. In an embodiment, this may be provided by performing a linear M×m transformation and may be represented by a M×m matrix, where each M×1 column is an eigenvector representing beamforming weights. Eigenbeamforming block 120 may be adapted to perform linear transformation in either or both the time and frequency domain. The eigenbeamforming block 120 is adapted to generate M outputs each of which is delivered to a different one of the M transmitters $125_1 \ldots 125_M$. Each transmitter 125 may be adapted to perform a number of signal processing functions, such as pulse-shaping, amplification, digital-to-analog conversions, etc. The output signals generated by the transmitters are transmitted via the M antennas $130_1 \ldots 130_M$.

Figure 2:
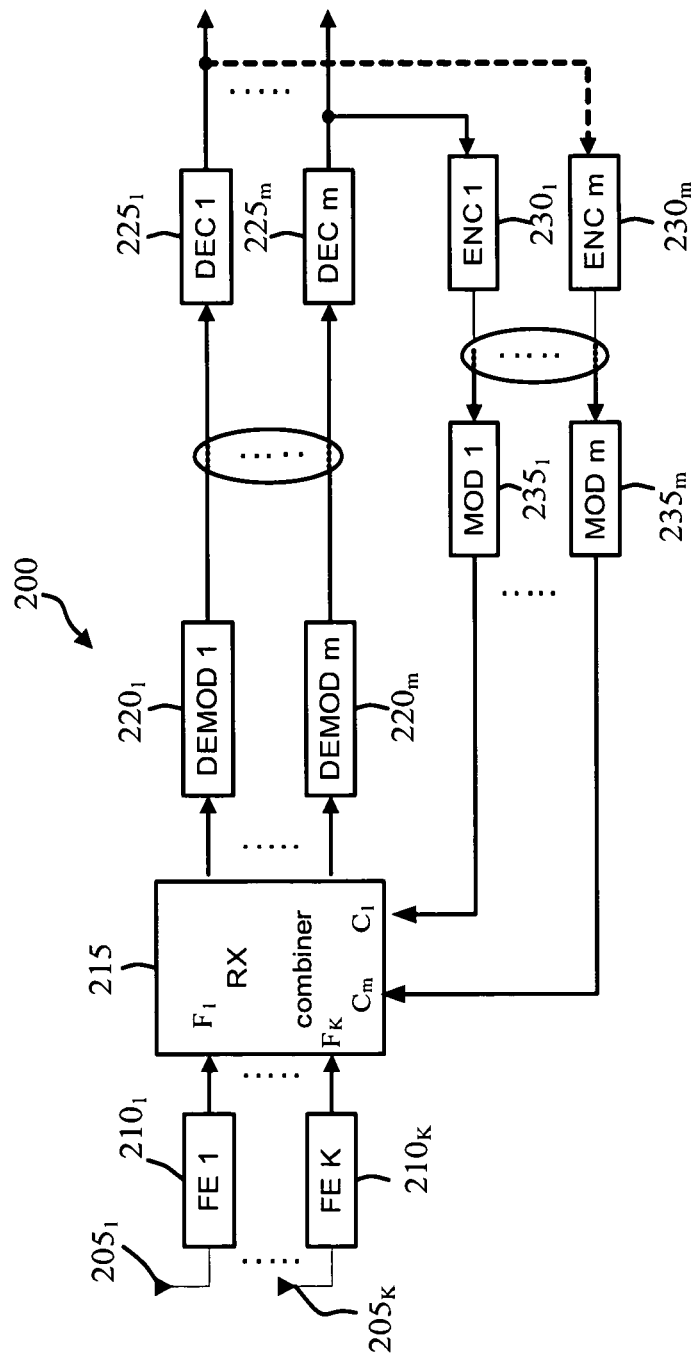
FIG. 2 is a simplified high-level block diagram of a K-channel receiver of a communication device for a MIMO communication system, in accordance with one embodiment of the present disclosure.

FIG. 2 is a simplified high level block diagram of a receiver end 200 of the m×K MIMO communication system, in accordance with one embodiment of the present disclosure. Receiver 200 is shown as including K receivers $210_1 \ldots 210_K$ each adapted to receive the signal received by one of the K receive antennas $205_1 \ldots 205_K$. Each receiver 210 performs a number of signal processing functions, such as amplification. The K processed signals are supplied to receive combiner block 215 which is a spatial filter. Receive combiner 215 is an m×K linear filter adapted to recover the data segments modulated by modulators $110_1 \ldots 110_m$ from their noisy mixtures as received at the receive antennas $205_1 \ldots 205_K$. In some embodiments, receive combiner 215 performs a linear minimum mean-square error (MMSE) filtering operation. Depending on the air interface used, receive combiner 215 may be adapted to perform its filtering operation in the time and/or frequency domain.

The m outputs of the receive combiner 215 are demodulated by demodulators $220_1 \ldots 220_m$ and subsequently decoded by decoders $225_1 \ldots 225_m$. Receiver 200 has two modes of operation, namely spatial multiplexing (SM) mode and successive interference cancellation (SIC) as described further below.

In accordance with the SM mode, each stream is extracted, i.e., demodulated/decoded by treating the mixture of each of the other streams as a Gaussian interference. The signals generated by decoders $225_1 \ldots 225_m$ form the output signals of receiver 200 in this mode.

In accordance with the SIC mode, the outputs of the combiner are combined, demodulated, and decoded successively. After each combining, demodulation, and decoding step, the recovered stream is used to reconstruct its contribution to the received mixture of signals. This contribution is cancelled from the received mixture in the combiner, prior to the extraction of the following stream. Accordingly, the previously decoded signals are encoded by encoders 230 and modulated by modulators 235 to generate canceling signals that are supplied to receive combiner 215 via input ports $C_1 \ldots C_m$. Receive combiner 215 modifies the signals its receives from receivers 210 via ports $F_1 \ldots F_K$ by the corresponding canceling signals it receives via ports $C_1 \ldots C_m$. Unless otherwise indicated, it is understood that each scalar quantity, vector component or matrix element described below may be a complex number. The labeling convention used herein for alphanumeric symbols represents scalar quantities as italic symbols, vectors as lowercase bold symbols, and matrices as uppercase bold symbols.

In accordance with the present disclosure, both SM/SIC modes are adapted to improve transmission when the CSI at the transmitter is less than optimal as described further below. Assume y is the K×1 vector of received signals at the outputs of receivers 210, x is the corresponding m×1 vector at the output of eigenbeamforming block 120, n is the K×1 observation noise vector assumed to be a complex Gaussian spatially uncorrelated with zero mean and unit power, and H is the K×M matrix which describes a channel between the set of M transmit and K receive antennas corresponding to certain time and/or frequency bin. Vector y may thus be defined as follows:

$$y = Hx + n \qquad (1)$$

The eigenbeamforming transformation B performed by eigenbeamforming block 120 may be defined as an M×m matrix such that:

$$x = Bs \qquad (2)$$

where s is the m×1 vector of modulated symbols supplied at the outputs of modulators 110. Assume that the transmitting end 100 has a substantially accurate CSI. Accordingly, the eigenbeamforming transformation may be chosen as a subset of the m principal right-hand singular vectors of the channel matrix, as shown below:

$$H = U\Lambda V', \; B = [V_{:,1}, \ldots V_{:,m}], \qquad (3)$$

where U is the K×min{M, K} unitary matrix of the left-hand singular vectors of H, V is the min{M, K}×M unitary matrix of the right-hand singular vectors of H and Λ is the diagonal matrix of the associated singular values. Without loss of generality, assume $\Lambda_1 \geq \ldots \geq \Lambda_{min\{M,K\}}$. According to (3), assume that m <min{M,K} streams are transmitted over the principal components of H. According to equations (1)-(3), in the case of substantially perfect CSI, the following expression applies:

$$y = [U_{:,1}, \ldots, U_{:,m}] \begin{bmatrix} \Lambda_1 & 0 & 0 \\ 0 & \ddots & 0 \\ 0 & 0 & \Lambda_m \end{bmatrix} \begin{bmatrix} s_1 \\ \vdots \\ s_m \end{bmatrix} + n \qquad (4)$$

Assuming a substantially perfect CSI at the transmitting end 100, an optimal receive combiner 215 filters the received vector y according to the left-hand singular modes, as follows:

$$z = [U_{:,1}, \ldots, U_{:,m}]^* y = \begin{bmatrix} \Lambda_1 & 0 & 0 \\ 0 & \ddots & 0 \\ 0 & 0 & \Lambda_m \end{bmatrix} \begin{bmatrix} s_1 \\ \vdots \\ s_m \end{bmatrix} + \underline{n} \qquad (5)$$

where z is the m×1 output of the receive combiner 215 and $\underline{n}$ is the transformed noise:

$$\underline{n} = [U_{:,1}, \ldots, U_{:,m}]^* n \qquad (6)$$

Figure 3:
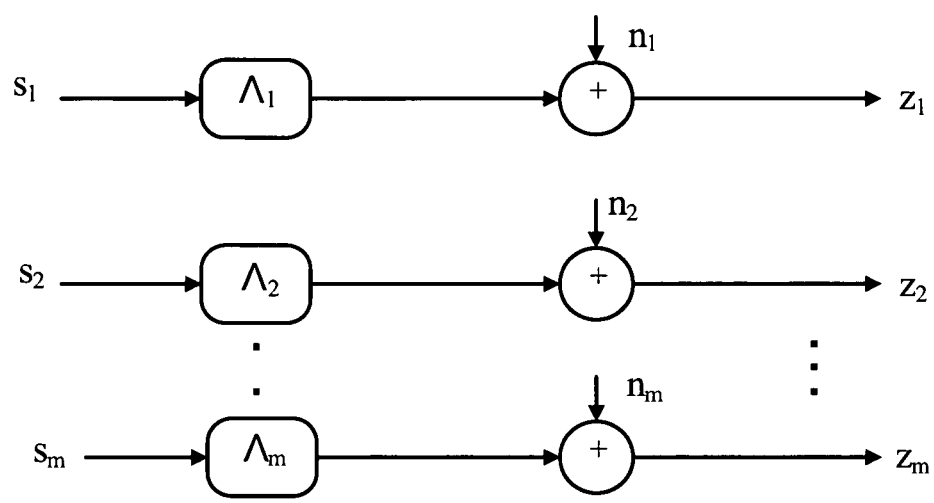
FIG. 3 shows a set of parallel independent noisy subchannels associated with the transmitter and receivers shown in FIGS. 1 and 2.

The noise term $\underline{n}$ is an uncorrelated Gaussian noise. Note that the equivalent channel in equation (5) is a set of parallel independent noisy subchannels. FIG. 3 is a block diagram of such an equivalent channel.

Therefore, in accordance with the present disclosure, to improve transmission when the CIS is not well known, bit loading and rate adaptation may be carried out as described below. For all streams delivered to subchannels $145_1 \ldots 145_m$ of transmitting end 100, appropriate modulation sizes, e.g. PSK or QAM, are selected to accommodate the information rates $I_1 \ldots I_m$ corresponding to the signal-to-noise ratios $\{\Lambda_k^2\}$ of these subchannels. A scaling factor may be applied to account for losses caused by imperfect knowledge of the CSI at the transmitting end 100. The scaling factor, which is carried out in the SIC mode as described above, provides for the accounting of the residual interference between the subchannels of the receiving end 200, imperfect knowledge of $\{\Lambda_k^2\}$, channel estimation errors at the receiving end 200, etc.

In accordance with the information rates $I_1 \ldots I_m$ and the actual number of bits per symbol $n_1 \ldots n_m$, a single coding rate R ($R = R_1 = \ldots R_m$) is defined as follows:

$$R \leq \sum_{k=1}^{m} I_k \Big/ \sum_{k=1}^{m} n_k \qquad (7)$$

The scaling factor in inequality (7) depends on such factors as the forward error correction scheme, etc. The scaling factor is used to control the degree of back-off with respect to the estimated rate. Assuming a nearly perfect knowledge of CSI and an ideal transceiver, the maximum achievable rate per subchannel satisfies:

$$R = \frac{1}{m} \sum_{k=1}^{m} \log_2(1 + \Lambda_k^2) \qquad (8)$$

which yields the Shannon limit for the channel H with the equal power allocation. The power allocation may be further optimized according to the signal-to-noise ratio profile $\{\Lambda_k^2\}$.

In the above, the exact channel matrix H may be unknown at the transmitter, therefore, only an estimate $\hat{H}$ of H is typically available ($\hat{H} \approx H$). Such an estimate may be obtained either from channel reciprocity in TDD systems or through a feedback channel that generates the canceling signals, as described above and shown in FIG. 2. Based on $\hat{H}$, the transmitting end 100 computes the estimates $\hat{\Lambda}$, $\hat{V}$ and $\hat{B}$ according to expression (3):

$$\hat{H} = \hat{U}\hat{\Lambda}\hat{V}^*, \; \hat{B}[\hat{V}_{:,1}, \ldots, \hat{V}_{:,m}]. \qquad (9)$$

According to equation (9), the vector x generated by eigenbeamforming block 125 is computed as shown below:

$$x = \hat{B}s. \qquad (10)$$

An example of bit loading and rate adaptation, in accordance with the present disclosure is provided below. Assume that m=3 and $$\hat{\Lambda} = \begin{bmatrix} \hat{\Lambda}_1 & 0 & 0 \\ 0 & \hat{\Lambda}_2 & 0 \\ 0 & 0 & \hat{\Lambda}_3 \end{bmatrix} = \begin{bmatrix} 20.0 & 0 & 0 \\ 0 & 5.0 & 0 \\ 0 & 0 & 1.26 \end{bmatrix}. \quad (11)$$

To choose the appropriate modulation sizes for these three eigenbeams, information rates corresponding to the respective signal-to-noise ratios (SNR) of 20.0 (≈13 dB), 5.0 (≈7 dB) and 1.26 (≈1 dB) are computed. Information rates associated with various used modulation sizes are given in the table 1 below. However, other information rates may be achieved.

TABLE I

| SNR | QPSK | 16 QAM | 64 QAM |
|---|---|---|---|
| 20.0 dB | 2.00 bps/Hz | 3.72 bps/Hz | 4.08 bps/Hz |
| 10.0 dB | 1.89 bps/Hz | 2.42 bps/Hz | 2.45 bps/Hz |
| 01.0 dB | 1.11 bps/Hz | 1.14 bps/Hz | 1.14 bps/Hz |

According to values shown in Table 1 above, information rates for the different eigenbeams may be selected based upon the SNR. For the strongest beam ($\hat{\Lambda}_1$), the highest order modulation scheme, here 64 QAM, is selected since the corresponding spectral efficiency substantially exceeds that of the next lower modulation scheme (16 QAM). Hence for the strongest stream, 64 QAM with $I_1$=4.08 bps/Hz is selected. For the second strongest beam ($\hat{\Lambda}_2$), the second highest modulation scheme, here 16 QAM, with $I_2$=2.42 bps/Hz and $n_1$=4 is selected since using the highest order modulation scheme, here (64 QAM), only provides a marginal improvement, i.e., 0.03 bps/Hz. Likewise, QPSK modulation scheme is selected with $I_3$=1.11 bps/Hz and $n_1$=2 for the weakest beam ($\hat{\Lambda}_3$). These results are summarized in Table II below.

TABLE II

|  | FIRST BEAM | SECOND BEAM | THIRD BEAM |
|---|---|---|---|
| Modulation | 64 QAM | 16 QAM | QPSK |
| $I_k$ | 1.11 bps/Hz | 2.42 bps/Hz | 4.08 bps/Hz |
| $n_k$ | 6 bits/symbol | 4 bits/symbol | 4 bits/symbol |

Based on the numbers in Table II, forward error correction (FEC) coding rate is chosen. According to inequality (7), it is found that $$R \leq \frac{I_1 + I_2 + I_3}{n_1 + n_2 + n_3} = \frac{4.08 + 2.24 + 1.11}{6 + 4 + 2} = 0.62 \quad (12)$$

Because the inequality (7) is related to the processing loss caused by various factors such as non-ideal FEC, or errors in estimating the CSI at the transmitter (CSI), or processing losses at the receiver, the value of R is dependent, in part, on the implementation. For example, in one embodiment, R may be selected to have a value of ½ (0.5), representing an aggressive selection (for packet loss tolerant scenarios). Alternatively, in another embodiment R may be selected to have a value of ⅓ (0.33), representing a conservative selection. Therefore, as shown in the above example, modulation sizes are chosen based on the empirical information rates deduced from the estimated SNRs while the inaccuracy due to estimation errors is accounted for by the scaling in the FEC rate selection.

As is often the case, the transmitter's knowledge of the CSI is imperfect. Accordingly, assume that the eigenbeamforming matrix $\hat{B}$ is used by eigenbeamforning block 120. According to equations (1) and (10), the following expression applies:

$$y = H\hat{B}s + n. \quad (13)$$

At the receiving end 200, the overall channel matrix $H\hat{B}$ is estimated. Typically, channel estimation is possible due to pilot signals. A possible implementation of pilot signals consists of transmitting a reference set of symbols s over a set of symbols in time and/or frequency domain, depending on the air interface chosen. Channel estimation results in an estimate $\hat{G}$ of the combined channel $H\hat{B}$ such that $\hat{G} \approx H\hat{B}$. Given an estimate $\hat{G}$ of the combined channel, one may use MMSE filter defined by:

$$\check{G} = (I + \hat{G}^* \hat{G})^{-1} \hat{G}. \quad (14)$$

Consequently, the m×1 output z of generated by receive combiner 215 is defined as follows:

$$z = \check{G} y. \quad (15)$$

In the case of an SIC receiver, the operations defined by expressions (14) and (15) are applied successively along with detection and cancellation of the detected signals. For example, assume that the first entry $s_1$ of s has been detected. Once the contribution of $s_1$ which consists of the vector $H_1 s_1$ with $H_1$ being the first column of H, is cancelled from the received vector x, the subsequent filtering operation performed by receive combiner 215 excludes this contribution from the consideration. This amounts to implementing of operations defined by expressions (14)-(15) where $\hat{G}$ is modified by removing its corresponding column (in this example, the first column). In a similar manner, the combiner output z will be of size (m−1)×1, containing the entries that correspond to $s_2$ through $s_m$.

The techniques described herein may be implemented by various means. For example, these techniques may be implemented in hardware, software, or a combination thereof. For a hardware implementation, the processing units within a access point or a access terminal may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

The previous description of the disclosed embodiments is provided to enable any person skilled in the art to make or use the features, functions, operations, and embodiments disclosed herein. Various modifications to these embodiments may be readily apparent to those skilled in the art, and the generic principles defined herein may be applied to other embodiments without departing from their spirit or scope. Thus, the present disclosure is not intended to be limited to the embodiments shown herein but is to be accorded the widest scope consistent with the principles and novel features disclosed herein.

What is claimed is:

1. A wireless communication device comprising:
a plurality of encoders each configured to receive and encode a different one of a plurality of data segments to generate an encoded data segment; wherein each of the plurality of encoders is configured to encode the respective data segment that the encoder receives at a same rate for simultaneously encoded data segments;
a plurality of modulators each configured to receive and modulate a different one of the plurality of encoded data segments to generate a modulated data segment according to a modulation technique, wherein at least two of the plurality of modulators utilize different modulation techniques for simultaneously modulated data segments; and
a plurality of transmitters each configured to receive and process a different one of the modulated data segments and to deliver the processed data segment to a different one of a plurality of associated transmit antennas for transmission,
wherein a first subset of the plurality of data segments that are received and encoded is associated with a first data stream and a second subset of the plurality of data segments that are received and encoded is associated with a second data stream, the first data stream being different from the second data stream, and
wherein for streams delivered to subchannels of the wireless communication device, the modulators are configured to select appropriate modulation sizes to accommodate information rates $I_1 \ldots I_m$, corresponding to signal-to-noise ratios of the subchannels, wherein m is the number of the plurality of encoders, the plurality of data segments or the plurality of modulators, respectively, and for the information rates $I_1 \ldots I_m$ and an actual number of bits per symbol $n_1 \ldots n_m$, the encoders are configured to use a single coding rate R, where $R = R_1 = \ldots = Rm$ and is defined as follows:

$$R \leq \sum_{k=1}^{m} I_k \Big/ \sum_{k=1}^{m} n_k.$$

2. The wireless communication device of claim 1, further comprising a beamforming block coupled between the plurality of modulators and the plurality of transmitters.

3. The wireless communication device of claim 1, wherein each of the plurality modulators is configured to modulate the data segment it receives using a different modulation technique for simultaneously modulated data segments.

4. The wireless communication device of claim 1, wherein each of the plurality of transmitters is configured to convert the modulated data segment it receives from a baseband signal to an RF signal.

5. A method comprising:
encoding each of a plurality of data segments at a same rate to generate a plurality of encoded data segments;
modulating each of the plurality of encoded data segments to generate a plurality of modulated data segments, wherein at least two of the plurality of encoded data segments are modulated according to different modulation techniques; and
transmitting the plurality of processed signals via a plurality of associated transmit antennas
receiving and processing the plurality of modulated data segments, and transmitting the plurality of processed data segments via a plurality of associated transmit antennas,
wherein a first subset of the plurality of data segments that are received and encoded is associated with a first data stream and a second subset of the plurality of data segments that are received and encoded is associated with a second data stream, the first data stream being different from the second data stream, and
wherein for streams delivered to subchannels of a transmitting end, appropriate modulation sizes are selected to accommodate information rates $I_1 \ldots I_m$ corresponding to signal-to-noise ratios of the subchannels, wherein m is the number of the plurality of data segments, the plurality of encoded data segments or the plurality of modulated data segments, respectively, and for the information rates $I_1 \ldots I_m$ and an actual number of bits per symbol $n_1 \ldots n_m$, a single coding rate R is utilized, where $R = R_1 = \ldots = Rm$ and is defined as follows:

$$R \leq \sum_{k=1}^{m} I_k \Big/ \sum_{k=1}^{m} n_k.$$

6. The method of claim 5 further comprising eigenbeamforming the modulated data segments prior to transmitting.

7. The method of claim 5 wherein modulating comprises modulating each of the plurality of encoded data segments according to different modulation techniques.

8. The method of claim 5 wherein processing each of the plurality of modulated data segments comprises converting each of the modulated data segments from a baseband signal to an RF signal.

9. A transmitter comprising:
means for receiving and encoding each of a plurality of data segments at a same rate to generate a plurality of encoded data segments;
means for modulating at least two of the plurality of encoded data segments using different modulation techniques to generate a plurality of modulated data segments; and
means for receiving and processing the plurality of modulated data segments, and transmitting the processed data segments via a plurality of associated transmit antennas,
wherein a first subset of the plurality of data segments that are received and encoded is associated with a first data stream and a second subset of the plurality of data segments that are received and encoded is associated with a second data stream, the first data stream being different from the second data stream, and
wherein for streams delivered to subchannels of the transmitter, the means for modulating are configured to select appropriate modulation sizes to accommodate information rates $I_1 \ldots I_m$ corresponding to signal-to-noise ratios of the subchannels, wherein m is the number of the plurality of data segments, the plurality of encoded data segments or the plurality of modulated data segments, respectively, and for the information rates $I_1 \ldots I_m$ and an actual number of bits per symbol $n_1 \ldots n_m$, the means for receiving and encoding are configured to use a single coding rate R, where $R = R_1 = \ldots = Rm$ and is defined as follows:

$$R \le \sum_{k=1}^{m} I_k \Big/ \sum_{k=1}^{m} n_k.$$

10. The transmitter of claim 9 further comprising:
means for modulating each of the plurality of encoded data using a different modulation technique.

11. The transmitter of claim 9 further comprising:
means for converting each of the modulated data segments from a baseband signal to an RF signal.

12. A non-transitory computer-readable medium having stored thereon processor-executable software instructions configured to cause a processor to perform steps comprising:
encoding each of a plurality of data segments at a same rate to generate a plurality of encoded data segments;
modulating each of the plurality of encoded data segments to generate a plurality of modulated data segments, wherein at least two of the plurality encoded data segments are modulated according to different modulation techniques; and
receiving and processing the plurality of modulated data segments, and transmitting the plurality of processed data segments via a plurality of associated transmit antennas,
wherein a first subset of the plurality of data segments that are received and encoded is associated with a first data stream and a second subset of the plurality of data segments that are received and encoded is associated with a second data stream, the first data stream being different from the second data stream, and
wherein for streams delivered to subchannels of a transmitting end, appropriate modulation sizes are selected to accommodate information rates $I_1 \ldots I_m$ corresponding to signal-to-noise ratios of the subchannels, wherein m is the number of the plurality of data segments, the plurality of encoded data segments or the plurality of modulated data segments, respectively, and for the information rates $I_1 \ldots I_m$ and an actual number of bits per symbol $n_1 \ldots n_m$, a single coding rate R is utilized, where $R = R_1 = \ldots = Rm$ and is defined as follows:

$$R \le \sum_{k=1}^{m} I_k \Big/ \sum_{k=1}^{m} n_k.$$

13. The non-transitory computer-readable medium of claim 12, wherein the stored processor-executable software instructions are configured to cause a processor to perform further steps comprising:
eigenbeamforming the modulated data segments prior to transmitting.

14. The non-transitory computer-readable medium of claim 12, wherein the stored processor-executable software instructions are configured to cause a processor to perform further steps comprising:
modulating each of the plurality of encoded data segments according to different modulation techniques.

15. The non-transitory computer-readable medium of claim 12, wherein the stored processor-executable software instructions are configured to cause a processor to perform further steps comprising:
converting each of the transformed signals from a baseband signal to an RF signal.

16. The non-transitory computer-readable medium of claim 12, wherein the stored processor-executable software instructions are configured to cause a processor to perform further steps comprising:
filtering each of the transformed signals,
amplifying each of the transformed signals; and
converting each of the transformed signals from a digital signal to an analog signal.

17. A wireless communication device comprising:
a plurality of encoders each configured to receive and encode a different one of a plurality of data segments to generate an encoded data segment; wherein each of the plurality of encoders is configured to encode the respective data segment that the encoder receives at a single rate for simultaneously encoded data segments; and
a plurality of modulators each configured to receive and modulate a different one of the plurality of encoded data segments to generate a modulated data segment according to a modulation technique, wherein at least two of the plurality of modulators utilize different modulation techniques for simultaneously modulated data segments;
wherein a first subset of the plurality of data segments that are received and encoded is associated with a first data stream and a second subset of the plurality of data segments that are received and encoded is associated with a second data stream, the first data stream being different from the second data stream, and
wherein the encoders are configured to use a single coding rate that is less than or equal to a ratio of (1) a sum of information rates of the subchannels and (2) a sum of bits per symbol for the subchannels.

* * * * *